US012117746B2

(12) United States Patent
Orlik et al.

(10) Patent No.: US 12,117,746 B2
(45) Date of Patent: Oct. 15, 2024

(54) PRINT TREATMENT UNITS (71) Applicant: Hewlett-Packard Development Company, L.P., Spring, TX (US)

(72) Inventors: Fernanda Orlik, Ness Ziona (IL); Albert Teishev, Ness Ziona (IL); Alex Veis, Netanya (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 373 days.

(21) Appl. No.: 17/256,668

(22) PCT Filed: Mar. 22, 2019

(86) PCT No.: PCT/US2019/023573
§ 371 (c)(1),
(2) Date: Dec. 29, 2020

(87) PCT Pub. No.: WO2020/197535
PCT Pub. Date: Oct. 1, 2020

(65) Prior Publication Data
US 2022/0004122 A1 Jan. 6, 2022

(51) Int. Cl.
G03G 15/10 (2006.01)
C09D 11/107 (2014.01)
C09D 11/52 (2014.01)
G03G 15/20 (2006.01)

(52) U.S. Cl.
CPC ............ G03G 15/10 (2013.01); C09D 11/107 (2013.01); C09D 11/52 (2013.01); G03G 15/2007 (2013.01)

(58) Field of Classification Search
CPC .................... G03G 15/10; G03G 15/2007
See application file for complete search history.

(56) References Cited

U.S. PATENT DOCUMENTS

| 8,012,908 | B2 | 9/2011 | Koide et al. |
| 8,628,187 | B2 | 1/2014 | Roof et al. |
| 2002/0106227 | A1 | 8/2002 | Rohde et al. |
| 2003/0077538 | A1 | 4/2003 | Kitson et al. |
| 2006/0275595 | A1 | 12/2006 | Thies et al. |

(Continued)

FOREIGN PATENT DOCUMENTS

| EP | 0634463 A2 | 1/1995 |
| EP | 2388146 A2 | 11/2011 |

(Continued)

*Primary Examiner* — Peter L Vajda
(74) *Attorney, Agent, or Firm* — Jordan IP Law, LLC (57) ABSTRACT A method is disclosed. The method may comprise forming an image on a surface by controlled electrostatic transfer of a fluid print agent comprising thermoplastic resin disposed in a carrier fluid. The method may also comprise heating the fluid print agent on the surface to remove the carrier fluid and to melt the thermoplastic resin and allowing the melted thermoplastic resin in continuous areas on the surface to fuse together to form an image from fused print agent. The method may further involve providing a printed substrate bearing the image formed from fused print agent. The method may further comprise irradiating the printed substrate with an ultraviolet narrowband source so as to cause heating of the fused print agent to melt the thermoplastic resin. A print system and a print apparatus are also disclosed.

8 Claims, 5 Drawing Sheets (56) References Cited

U.S. PATENT DOCUMENTS

| | | |
|---|---|---|
| 2007/0048653 A1 | 3/2007 | Ide |
| 2008/0095558 A1 | 4/2008 | Schleusener |
| 2009/0035458 A1* | 2/2009 | Yoshie .................. G03G 15/11 |
| | | 399/249 |
| 2010/0127433 A1 | 5/2010 | Medina et al. |
| 2012/0062666 A1 | 3/2012 | Roof et al. |
| 2018/0004110 A1 | 1/2018 | Ron et al. |
| 2019/0011857 A1* | 1/2019 | Horiguchi ................ G03G 9/13 |

FOREIGN PATENT DOCUMENTS

| | | |
|---|---|---|
| EP | 3173232 A1 | 5/2017 |
| JP | 2000137342 A | 5/2000 |
| JP | 2002055463 A | 2/2002 |
| JP | 2002251040 A | 9/2002 |
| WO | WO-2017060600 A1 | 4/2017 |

\* cited by examiner

PRINT TREATMENT UNITS

BACKGROUND

In some print operations, a printed image may be formed from a print agent on a substrate where the print agent comprises a thermoplastic resin. In some instances the printed substrate bearing the printed image may undergo a subsequent treatment operation where varnishes and/or laminates are applied to the substrate bearing the printed image.

BRIEF DESCRIPTION OF DRAWINGS

Examples will now be described, by way of non-limiting example, with reference to the accompanying drawings, in which.

DETAILED DESCRIPTION

In some print processes, an image on a printed substrate may be formed by the controlled application of at least one print agent, e.g. ink, to the substrate. Some print processes involve use of at least one print agent, such as an LEP ink, which comprises at least one component selected for certain optical properties, for example a colorant or pigment, and also a thermoplastic resin. The print agent may be controllably applied to a surface in a fluid state, for instance the fluid print agent may comprise thermoplastic resin particles in a carrier fluid. In some print processes the fluid print agent may be capable of carrying an electric charge and may be applied to the surface by controlled electrostatic transfer, for example by electrophotography or xerography or a similar or related process. Once the fluid print agent is deployed on the surface it may be heated, for example by infrared heating or hot air knives, to dry the fluid print agent by evaporation of the carrier fluid. The heat applied for drying also causes the thermoplastic resin of the print agent to melt. The melted thermoplastic resin in continuous areas on the surface may then be allowed to fuse together and cool and set.

In some print processes fluid print agent is controllably applied to an intermediate surface and then heated on the intermediate surface to remove the carrier fluid and to melt the thermoplastic resin on the intermediate surface. The image formed from the fused print agent may then be transferred to a print substrate, for example by contact pressure, to provide the printed substrate for the final print product.

Some prints formed in such a way may become damaged from rubbing or scratching. Therefore, in some instances, such printed substrates may undergo subsequent treatment processes, where a varnish or laminate is applied to the printed substrate for durability reasons. Such treatment processes increase the durability of the prints making them less susceptible to damage from scratching and rubbing but involves the use of varnishes or laminates.

The present disclosure relates to methods, systems and apparatus of providing printed substrates using print agents comprising thermoplastic resin. The methods, systems and apparatus of the present disclosure can provide durable prints without subsequent varnishing or lamination processes.

Figure 1:
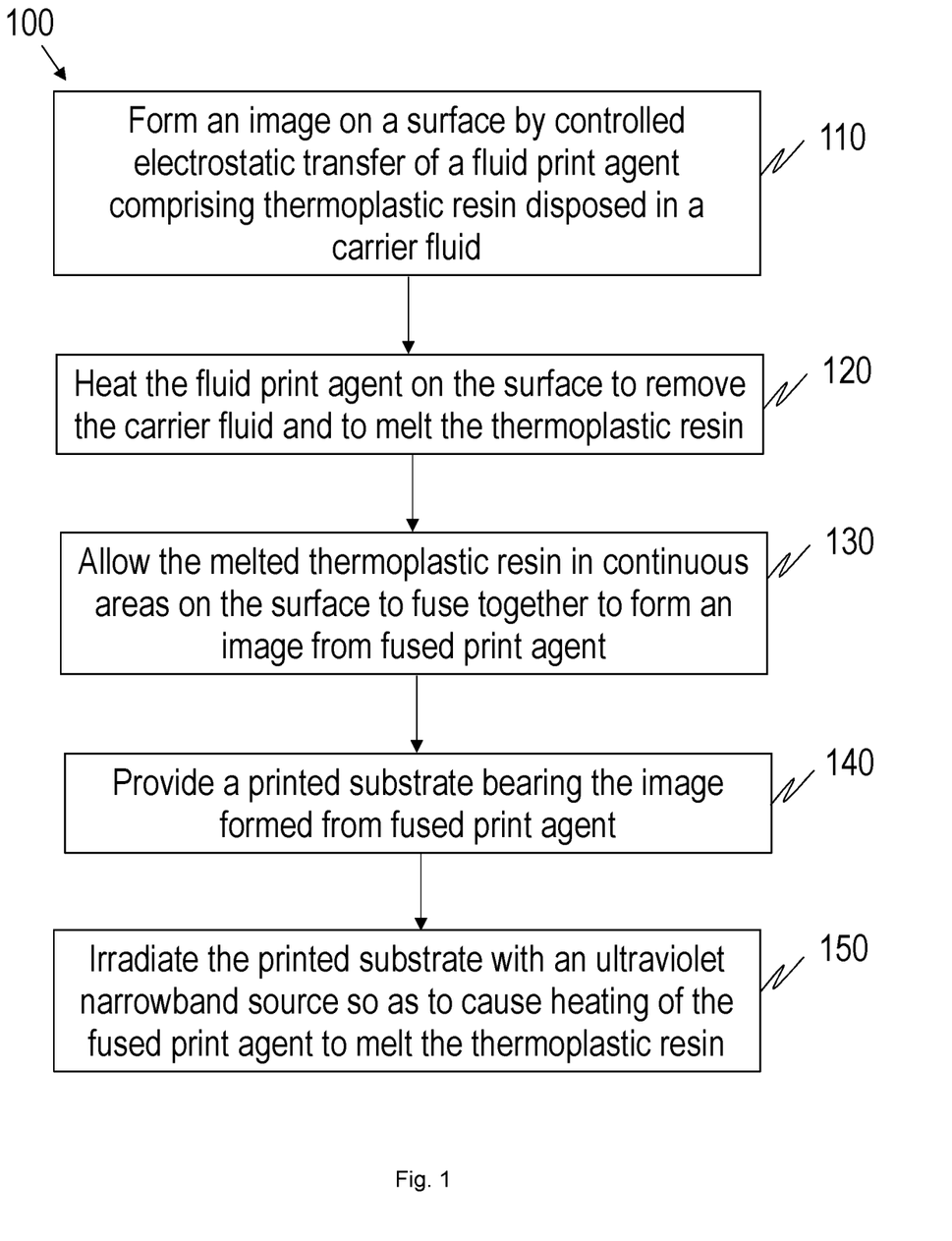
FIG. 1 is a flowchart of an example of method of treating a printed substrate.

FIG. 1 illustrates a flowchart of a method 100 according to one example. The method comprises, at block 110, forming an image on a surface by controlled electrostatic transfer of a fluid print agent comprising thermoplastic resin disposed in a carrier fluid. At block 120 the method comprises heating the fluid print agent on the surface to remove the carrier fluid and to melt the thermoplastic resin. The method further comprises, at block 130, allowing the melted thermoplastic resin in continuous areas on the surface to fuse together to form an image from fused print agent. At block 140 the method comprises providing a printed substrate bearing the image formed from fused print agent. The method 100 further comprises, at block 150, irradiating the printed substrate with an ultraviolet narrowband source so as to cause heating of the fused print agent to melt the thermoplastic resin.

The method 100 of the example illustrated in FIG. 1 is thus a method of providing a printed substrate having a printed image formed thereon from a fused print agent that comprises thermoplastic resin. The method involves forming a printed substrate from a fused print agent and applying a subsequent treatment. For the purposes of the present disclosure a fused print agent is one in which thermoplastic resin of continuous areas of the print agent has fused together. The fused print agent may, for instance, be at least partially fixed or set such that continuous areas of fused print agent form a continuous film, for example a viscous film. A fused print agent can be a print agent in which the thermoplastic resin is set or partially set, for example set or fixed so as to not be free flowing, i.e. so as to not flow in the absence of applied pressure.

As used herein a print agent comprising a thermoplastic resin is a composition, for example an ink such as a liquid electrophotographic (LEP) ink, which may be controllably applied to a surface in fluid form to form at least part of an image and which may be heated to melt the thermoplastic resin, which then fuses, as part of a print process. The term image will be understood as relating to any particular pattern of print agent, e.g. any generally two-dimensional arrangement on a surface. The print agent is thus a print agent which is suitable for being controllably applied in a desired pattern in a fluid state and then fused, by heating the print agent to melt the thermoplastic resin and allowing continuous areas of thermoplastic resin to fuse together.

The print agent comprises at least one component which is a thermoplastic resin and at least one component selected for certain optical properties, for instance a colorant, such as a pigment or the like. Note that whilst the optical property may comprise a particular colour or optical effect within the visible spectrum, in some instances the optical properties could be properties in response to illumination with radiation outside of the visible range, and the terms optical, colorant and pigment will be understood accordingly. In fluid form the print agent may comprise particles of thermoplastic resin and colourant disposed in a carried fluid. In some examples the colorant may be encapsulated in the thermoplastic resin.

In some examples, the thermoplastic resin may comprise a copolymer of an alkylene monomer and a monomer selected from acrylic acid and methacrylic acid. In some examples, the thermoplastic resin may comprise a copolymer of an ethylene acrylic acid resin, an ethylene methacrylic acid resin or combinations thereof. In some examples, the thermoplastic resin may comprise an ethylene acrylic acid resin, an ethylene methacrylic acid resin or combinations thereof. In some examples, the carrier fluid is a hydrocarbon carrier liquid such as an isoparaffinic carrier liquid, for example Isopar-L™ (available from EXXON CORPORATION).

The thermoplastic resin may be selected from ethylene acrylic acid copolymers; methacrylic acid copolymers; ethylene methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl may include from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the thermoplastic resin comprises a first polymer that is a copolymer of ethylene or propylene and an ethylenically unsaturated acid of either acrylic acid or methacrylic acid. In some examples, the first polymer is absent ester groups and the thermoplastic resin further comprises a second polymer having ester side groups that is a co-polymer of (i) a first monomer having ester side groups selected from esterified acrylic acid or esterified methacrylic acid, (ii) a second monomer having acidic side groups selected from acrylic or methacrylic acid and (iii) a third monomer selected from ethylene and propylene.

Prior to printing the resin may constitute 5% to 99% by weight of the solids in the fluid print agent composition, in some examples, 50% to 90% by weight of the solids of the fluid print agent composition, in some examples, 70% to 90% by weight of the solids of the fluid print agent composition. The remaining wt % of the solids in the fluid print agent composition may be the colorant and, in some examples, any other additives that may be present.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the colorant may be a pigment selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of TiO2, calcium carbonate, zinc oxide, and mixtures thereof. In some examples the white pigment particle may comprise an alumina-TiO2 pigment. The colorant may be present in the fluid print agent composition in an amount of from 10 wt % to 80 wt % of the total amount of resin and colorant, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant may be present in the fluid print agent in an amount of at least 50 wt % of the total amount of resin and colorant, for example at least 55 wt % of the total amount of resin and colorant.

In some examples the print agent may also comprise a charge carrier component, e.g. a charge director and/or a charge adjuvant, such that the print agent may be electrically charged for controlled application of the print agent to form the image for instance by an electrostatic printing process such as liquid electrophotographic printing. In some examples, the charge adjuvant includes aluminum di- or tristearate. A print agent which may be electrically charged may also be referred to as an electronic ink or an electrostatic ink. In some examples the prink agent may comprise a liquid electrophotographic ink, for example Electrolnk® and any other Liquid Electro Photographic (LEP) inks developed by Hewlett-Packard Company. A "liquid electrophotographic ink" or "LEP ink" generally refers to an ink composition, in liquid form, generally suitable for use in a liquid electrostatic printing process.

The method thus provides a printed image formed in a print process using a print agent comprising a thermoplastic resin, in which the print agent is applied, at block 110, in a controlled way in a non fused fluid state to form the image, i.e. a pattern on a surface. The image formed from the fluid print agent is subject to some initial print processing at block 120 involving heating to dry the print agent and to melt the thermoplastic resin. In some instances the heating to remove the carrier fluid and melt the thermoplastic resin may be performed continuously in one heating process, but in some examples there may be different heating applied to dry the print agent and then to melt the thermoplastic resin. At block 130 the melted thermoplastic resin is allowed to fuse together to form a fused print image. After heating to melt the thermoplastic resin at block 120 the melted resin on the surface in continuous areas may merge together, and the heating may then be removed to allow the print agent to cool and the thermoplastic resin to at least partially set. A printed substrate bearing the image formed from fused print agent may be provided at block 140, which may in some examples involve transferring the fused print agent from an intermediate surface to the print substrate. In some examples the printed image may be provided using a liquid electrophotographic (LEP) print process based on the controlled application of LEP ink. The print agent may thus, prior to the irradiation with UV radiation at block 150, have been heated to evaporate the carrier fluid and to melt the thermoplastic resin of the print agent, possibly on an intermediate surface prior to being transferred to the print substrate. The method then involves a separate treatment of the printed substrate bearing the image formed from fused print agent. The irradiation of the printed substrate at block 150 of FIG. 1, may thus be irradiation that occurs after drying of fluid print agent and an initial melting of the thermoplastic resin.

The irradiation of the printed substrate at block 150 of FIG. 1 heats the fused print agent to melt the thermoplastic resin. The print agent has previously been heated, at block 120, to evaporate a carrier fluid and melt the thermoplastic resin of the print agent, and thus the irradiation at block 150 may involve a melting of the thermoplastic resin which is subsequent to the earlier melting that occurs as part of providing the printed image. The irradiation at block 150 of the method of the example of FIG. 1 may thus involve re-melting of the thermoplastic resin of the print agent.

The irradiation of the fused print agent at block 150 may heat the thermoplastic resin to a relatively high temperature. In some examples the irradiation of the fused print agent may heat the thermoplastic resin so that the thermoplastic resin exhibits a relatively low viscosity. In some examples the irradiation of the fused print agent may heat the thermoplastic resin to a temperature of at least 140° C., and in some examples to temperatures of at least 150° C. or at least 170° C. At these temperatures the viscosity of the thermoplastic resin decreases and is low enough for the thermoplastic resin to flow on the substrate, i.e. to flow with no additional pressure applied. The thermoplastic resin may thus flow on the surface of the print substrate, which can allow the thermoplastic resin to flow to fill any gaps, for example micro-pores or the like, that may have existed between the surface of the substrate and the fused print agent, especially in the case where the fused print agent or ink was allowed to fuse on an intermediate surface and subsequently applied to the print substrate by contact pressure. At temperatures greater than 150° C. hydrogen bonds can be broken and this may enable greater chemical interaction between the components of the print agent and the substrate. The heated print agent may thus reorganize on the substrate and may bond with the substrate, which may increase the adhesion to the substrate. The increased adhesion improves the durability of the print agent or ink on the substrate and may result in the image being highly resistant to scratching and rubbing. Additionally at temperatures of at least 140° C. or at least 150° C. or at least 170° C., components of the print agent, for instance the thermoplastic resin, may separate and components of lower molecular weight may migrate to the surface of the layer of print agent which is not in contact with the print surface, which can improve adhesion. When the print agent subsequently cools these lower molecular weight components may act as a type of barrier or protective layer or coating for the printed image, which also may improve durability.

The irradiation of the printed substrate with an ultraviolet narrowband source can heat the thermoplastic resin of the print agent to relatively high temperatures without degrading the print substrate. For the purposes of the present disclosure the print substrate is the substrate of the final print product.

Print agents comprising thermoplastic resin such as LEP inks may absorb ultraviolet (UV) light highly efficiently. In particular the colorant or pigments of at least some LEP inks may exhibit a relatively high absorption for narrowband UV radiation. Thus components of the print agent, for instance colorants of an LEP ink, may absorb the UV radiation and thus cause heating of the print agent and the thermoplastic resin it comprises. The UV irradiation thus causes direct heating of the print agent itself. As the irradiation of the printed substrate is with narrowband UV radiation, the wavelength of the irradiating UV radiation can be selected such that the print agent absorbs a significant proportion or substantially all of the UV radiation. The substrate on which the fused print agent is formed may absorb very little or substantially no UV radiation. As such, the print agent on the substrate may be directly heated by the UV irradiation to increase the temperature of the thermoplastic resin. However there is no, or very little, direct heating of the substrate and any heating of the substrate will be via conduction from the heated print agent. The printed substrate can thus be irradiated with narrowband UV radiation to cause heating of the print agent, for instance to a temperature of at least 140° C. or at least 170° C., but with relatively limited heat transfer to the substrate and hence without substantial heating of the substrate. The print agent may therefore be heated to improve the adhesion to the substrate and the durability of the printed image but without the substrate being degraded by heat. This is possible with a narrowband UV irradiation.

Other heating techniques, such as infrared heating or hot air knives, which may be used in some print processes to dry a fluid ink on an intermediate surface, would, if used to heat a fused print agent on a print substrate for a final print product, result in significant heating of the substrate which could result in degradation of the substrate. Thus with infrared heating or hot air knives the heating of a fused print agent would be limited to a temperature lower than 140° C. to avoid damage to the substrate. Likewise broadband UV radiation would result in greater heating of the substrate.

The ultraviolet source may be narrowband in that the majority of the optical power in the output of the ultraviolet narrowband source is located within a narrow wavelength band or a few such narrow wavelength bands. In some examples a narrow wavelength band may be one which extends across a wavelength range of 100 nm or so, for instance within a band of ±50 nm of a defined frequency. In some examples a narrow wavelength band may be one that extends across a wavelength range of 50 nm or less, or than 30 nm of less. In some examples the majority of the optical power may be located within a single narrow ultraviolet waveband, although in some examples there may be a small number, for example one or two, additional narrow wavebands selected for efficient heating of the print agent. In some examples an additional narrow waveband might be outside of the ultraviolet wavelength range.

In some examples, a waveband of ultraviolet radiation output from the ultraviolet narrowband source may be between about 320 nm to about 420 nm, for example from about 350 nm to about 410 nm, and in some examples from about 365 nm to about 395 nm. In some examples, the ultraviolet narrowband source comprises an UV light emitting diode (LED) array. In some examples, the UV LED array may comprise at least one 385 nm LED. In some examples the UV LED array may comprise at least one 395 nm LED. In some examples, the UV LED array may comprise at least one 365 nm LED.

Figure 2:
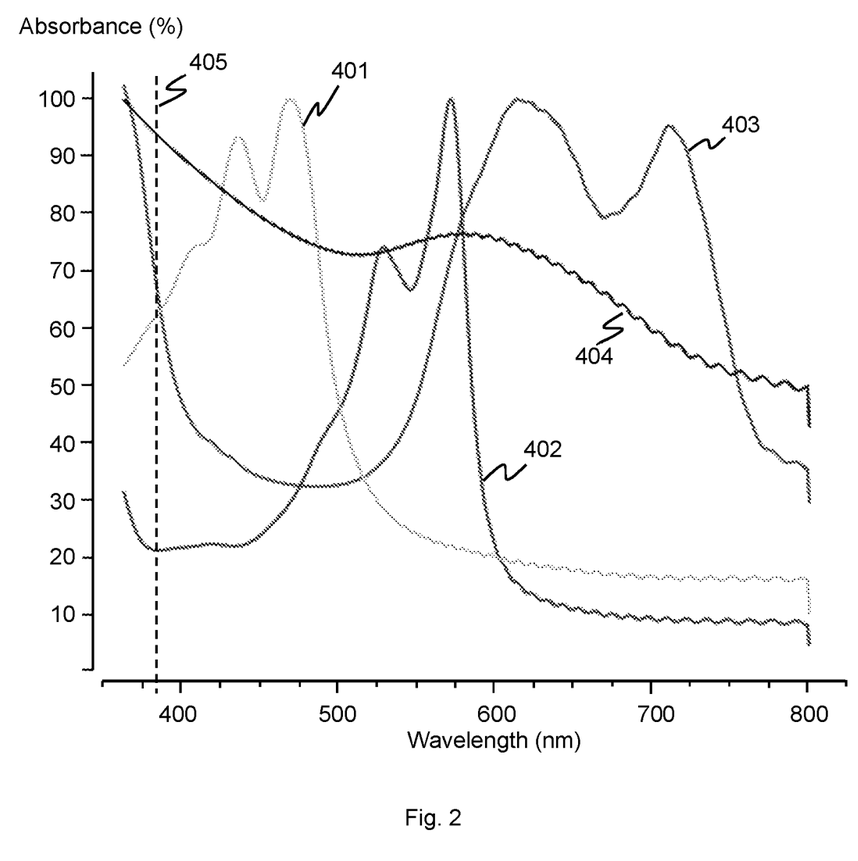
FIG. 2 shows examples of an absorption efficiency spectrum for different ink pigments irradiated by ultraviolet radiation.

FIG. 2 illustrates absorption spectra for one example of some example LEP inks. FIG. 2 illustrates measured absorption spectra for examples of yellow (401), magenta (402), cyan (403) and black B (404) LEP inks. These spectra were obtained by transmission measurement of a printed PET substrate with 100% coverage of the respective ink.

For these example inks, relatively high energy absorption efficiencies are achieved for the Cyan, Yellow and Black ink for UV irradiation. For instance at a wavelength of 385 nm, illustrated by dashed line 405, absorption efficiencies of greater than 60% may be achieved for these example inks. The absorption of this particular example of magenta ink is a bit lower than the other example inks at these wavelengths. In use, a different formulation for the magenta ink may be used, for example one which exhibits a greater absorbance for UV radiation. However, even if one component ink exhibits a relatively lower absorbance, it is the printed substrate which is illuminated with the narrowband ultraviolet radiation and the printed substrate bears a printed image which will most likely include multiple component inks and hence will include the inks that do absorb efficiently. Also, for these particular example inks, it is the black ink that is most susceptible to noticeable scratch damage in a final printed image. The black ink in this example exhibits a very high absorption to the UV radiation and thus is efficiently heated and is melted by the UV irradiation which provide increased adhesion and durability and reduces the susceptibility to scratch damage. In this example the yellow and cyan inks also experience improved adhesion.

In some examples, irradiating the printed substrate with an ultraviolet narrowband source comprises irradiating the printed substrate with radiation of a controlled optical power and for sufficient time to deliver a dose of radiation to heat the print agent to melt the thermoplastic resin. In some examples the narrowband UV source may supply a radiation dose to the printed substrate of the order of a few Joules per square centimetre or less. For example, a dose of about 0.75 $Jcm^{-2}$ to about 3.0 $Jcm^{-2}$ may be supplied in some examples, for instance at an irradiating wavelength at or around 395 nm. Such a dose may be achieved by a suitable UV source, such as an UV LED array with an exposure time of a few tenths of a second or less, for example from about 0.07 s to about 0.3 s. In such examples, these radiations doses or exposure times may enable the thermoplastic resin of the print agent to reach temperatures of greater than 140° C. In some examples, the print agent may be heated to temperatures above 150° C. or at least 170° C.

As noted, the UV radiation may be efficiently absorbed by the print agent but is not substantially absorbed by the print substrate. In some examples the print substrate may be an opaque white substrate such as paper. As the UV radiation used is relatively close to the visible range for any light actually incident on such a substrate, a high percentage, of non-absorbed UV light may be reflected from the substrate surface, travelling back through the layer of print agent, and allowing for further absorption by the print agent. In other examples the substrate may be substantially transparent to visible radiation and also substantially transparent to the UV radiation.

Figure 3:
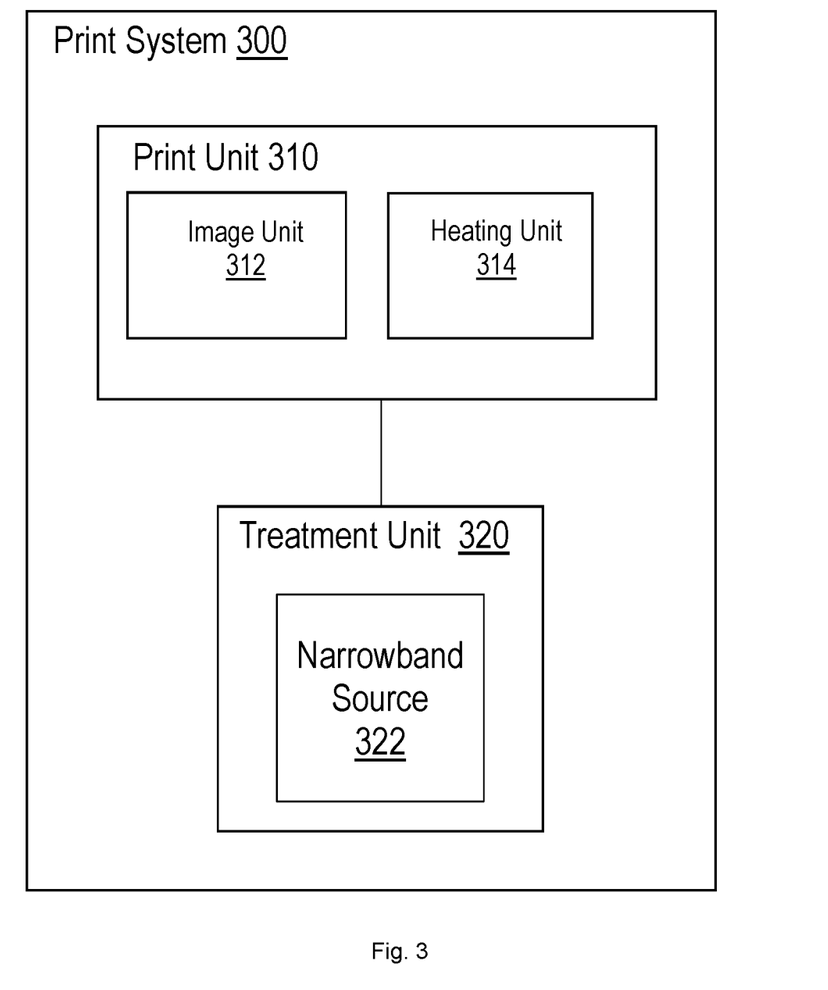
FIG. 3 is a simplified schematic of an example of a print system.

FIG. 3 illustrates a simplified schematic of an example of a print system 300. The print system 300 comprises a print unit 310 and a treatment unit 320. In this example, the print unit 310 is to print an image on a printed substrate with fused print agent comprising a thermoplastic resin. In this example, the print unit 310 comprises an image unit 312 to form an image on a surface by controlled electrostatic transfer of a fluid print agent comprising thermoplastic resin disposed in a carrier fluid. In this example the print unit 310 also comprises a heating unit 314 to heat the fluid print agent on the surface to remove the carrier fluid and to melt the thermoplastic resin to allow the melted thermoplastic resin in continuous areas on the surface to fuse together to form an image from fused print agent. The treatment unit 320 comprises a narrowband UV source 322. In this example, the treatment unit 320 is to receive the printed substrate and irradiate the printed substrate with ultraviolet radiation to heat the fused print agent on the printed substrate to melt the thermoplastic resin. In one example, the narrowband UV source 322 of treatment unit 320 may comprise a UV LED array, which may comprise a plurality of LEDs. In some examples, the narrowband UV source 322 may comprise at least one 395 nm UV LED, or at least one 385 nm UV LED or at least one 365 nm UV LED. UV LEDs with output wavelengths of 365 nm, 385 nm or 395 nm are readily available with good power efficiency. The UV LED array may comprise LEDs of the same type as one another, e.g. all of the same output wavelength although in some examples there may a combination of LEDs of different wavelength. In some examples, the print unit 310 may comprise any print apparatus capable of forming an image on a substrate by printing print agent comprising thermoplastic resin, e.g. LEP ink, on to the substrate. In some examples the print unit 310 may be a liquid electrostatic print unit. In some examples, print unit 310 and treatment unit 320 may be housed in the same module, with the treatment unit 320 able to receive a printed substrate from print unit 310. The print unit 310 is able to form an image on a substrate using at least one print agent comprising thermoplastic resin, e.g. LEP ink. For instance in one example, the image unit 312 is able to form an image using a plurality of different inks, such as LEP inks, which may comprise, without limitation cyan, magenta, yellow and black thermoplastic inks.

Print system 300 illustrates one example system where a printed substrate may be treated with UV radiation. The print unit 310 may form an image on a substrate through printing print agent comprising thermoplastic resin on to the substrate to form a printed substrate. The printed substrate may comprise fused print agent, which forms the image. The printed substrate may then be passed to treatment unit 320, which receives the printed substrate. At the treatment unit 320, the narrowband UV source 322 irradiates the printed substrate with UV radiation. As discussed above, the components of the print agent, for instance colorants within an LEP ink on the printed substrate, may absorb UV radiation wavelengths highly efficiently. The irradiation of the printed substrate therefore results in the print agent absorbing the UV radiation and undergoing heating. The heating results in the thermoplastic resin melting on the substrate which can increase the adhesion and durability of the printed image on the printed substrate.

Figure 4:
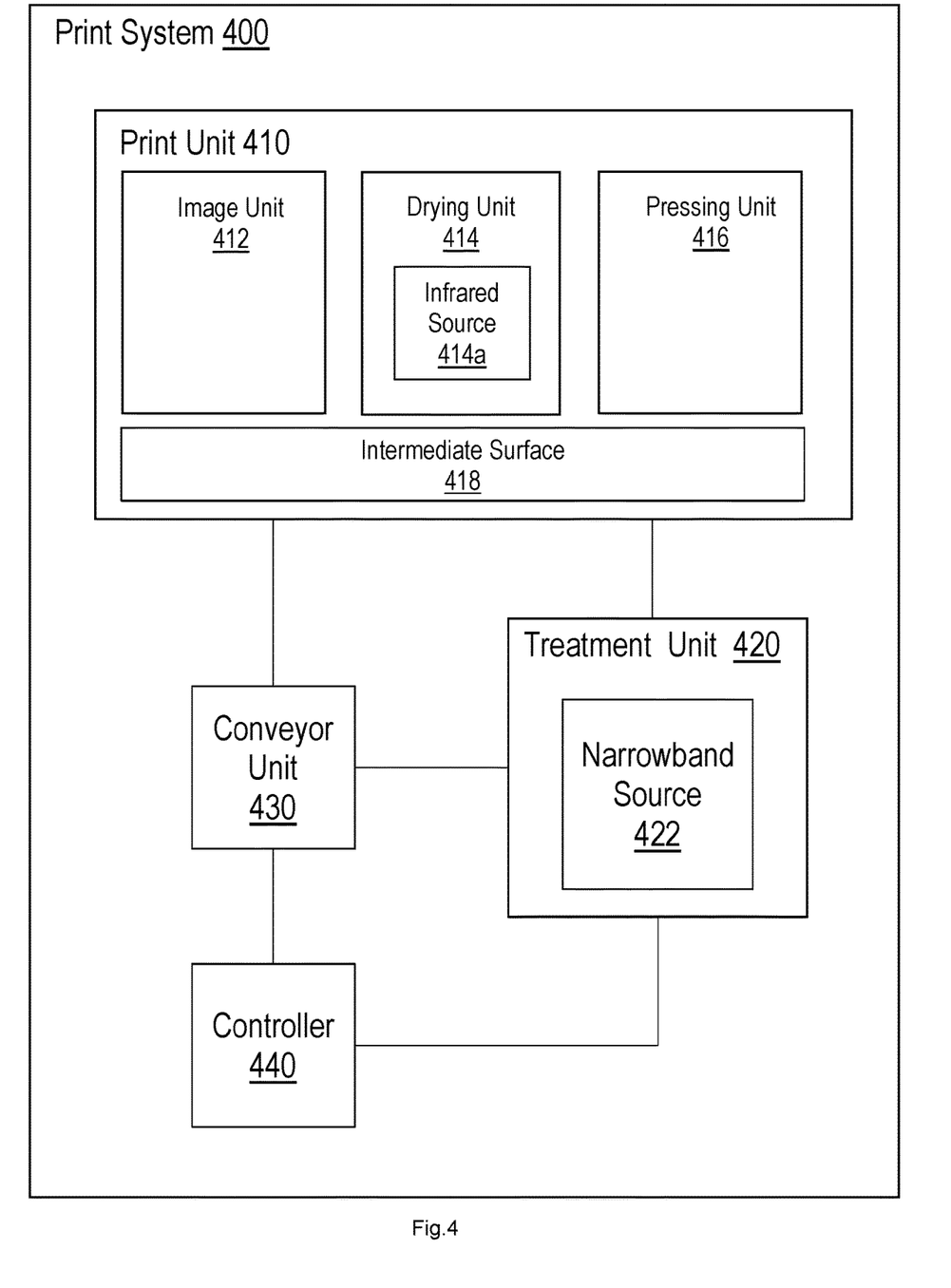
FIG. 4 is a simplified schematic of another example of a print system.

FIG. 4 illustrates another example print system 400. In this example, print system 400 comprises a print unit 410 and a treatment unit 420. In this example, print system 400, print unit 410 and treatment unit 420 may perform the same functions as print system 300, print unit 310 and treatment unit 320. Print unit 410 is therefore able to form a printed substrate through printing an image on the substrate with fused print agent comprising thermoplastic resin. Treatment unit 420 is then able to receive the printed substrate and irradiate the printed substrate with narrowband radiation from narrowband source 422 to cause heating of the fused print agent on the printed substrate to melt the thermoplastic resin. The narrowband source 422 may comprises a LED array with a plurality of LEDs 424 and may output ultraviolet radiation.

Print system 400 comprises conveyor unit 430 to convey the printed substrate from the print unit 410 to the treatment unit 420. In one example, the conveyor unit 430 may comprise at least one roller to convey the printed substrate to treatment unit 420. In some examples the conveyor unit 430 may comprise at least one conveyor belt. Print system 400 may also comprise controller 440 to control the narrowband source 422. In some examples the controller 440 may also control the conveyor unit 430 to convey the printed substrate to a position to irradiate the printed substrate with narrowband radiation, for instance ultraviolet radiation. In some examples the controller 440 may convey the printed substrate to a position with respect to the treatment unit 420 to be irradiated and control the narrowband source 422 to irradiate the printed substrate for a period of time. In some examples the treatment unit may be moved with respect to the printed substrate to allow the whole surface of the printed substrate to be irradiated with the narrowband radiation. In some examples the conveyor unit may convey the printed substrate through an irradiation area at a conveying speed such that the printed substrate is exposed to the narrowband radiation for a sufficient exposure time to cause melting of the thermoplastic resin.

Print unit 410 of print system 400 may comprise an image unit 412 for forming an image on a surface from print agent. The image unit 412 may, in one example, develop at least part of the image from fluid print agent, for instance from an ink such as an LEP ink. The image unit 412 may in some examples develop an image by controlled electrostatic transfer of the fluid print agent or ink, for example by electrophotography.

The example print unit 410 of print system 400 also comprises a drying unit 414. The drying unit 414 may heat the fluid print agent to dry the print agent by removing the carrier fluid. The heating by drying unit 414 may also melt the thermoplastic resin of the print agent so as to allow continuous areas of thermoplastic resin to fuse together. In some examples, drying unit 414 may comprise infrared source 414a to heat and dry the fluid print agent. The printed substrate may therefore comprise an image formed from fused print agent, for example from a print agent with at least partially fixed or set thermoplastic resin, which may then be passed to the treatment unit 420 to treat the printed substrate with narrowband radiation after heating by the drying unit 414. The treatment unit 420 may thus be separate from a drying unit 414 that forms part of the print unit 410.

In some examples print unit 410 may further comprise an intermediate surface 418, for example a surface of an intermediate drum, or some in some examples some other surface of a transfer member or belt or the like. The image unit 412 may controllably apply print agent, in fluid form, to the intermediate surface 418 to form the image. The drying unit 414 may be used to heat and dry the print agent on the intermediate surface 418. In this case the thermoplastic resin is melted and allowed to fuse on the intermediate surface, e.g. intermediate drum, before being transferred to the print substrate in a fused state. The fused print agent may be transferred to the print substrate by contact pressure applied by pressing unit 416. The printed substrate produced by the pressing unit 416 may be conveyed to the treatment unit 420 as discussed above.

Figure 5:
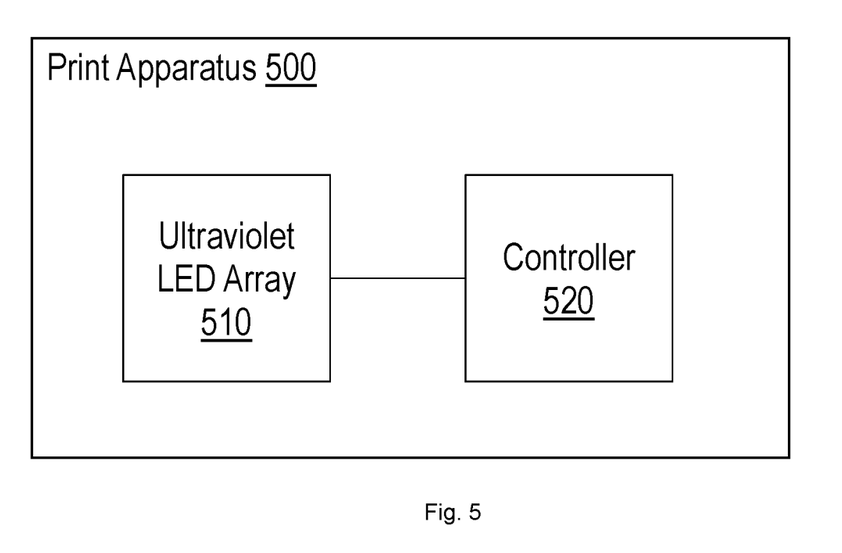
FIG. 5 is a simplified schematic of an example of a print apparatus.

FIG. 5 illustrates a simplified schematic of an example of a print apparatus 500. In this example, print apparatus 500 comprises a UV LED array 510. In this example, the print apparatus 500 further comprises a controller 520. In this example, the controller 520 controls the UV LED array to output ultraviolet radiation to heat thermoplastic resin of an electrostatic print agent on a printed substrate to a temperature of at least 140° C., in some examples at least 150° C. or at least 170° C. The print apparatus 500 may be positioned to output ultraviolet radiation and irradiate a printed substrate to cause heating of thermoplastic resin on the printed substrate. In some examples, the controller 520 may control the UV LED array 510 to activate and irradiate a printed substrate. In another example, once the printed substrate has been irradiated for a sufficient exposure time to cause sufficient heating of the thermoplastic resin, the controller 520 may control the UV LED array 510 to deactivate and thus cease irradiation of the printed substrate. In some examples, the controller 520 may control the UV LED array 510 to control the intensity of the ultraviolet radiation, for example by selectively controlling at least one LED of the UV LED array 510 in terms of selectively activating or not LEDs of the LED array or controlling the power supplied to at least one LED of the UV LED array 510. In some examples, the controller 520 may control the power supplied to the UV LED array 510 and the exposure time with which the printed substrate is irradiated with ultraviolet radiation to cause heating of the thermoplastic resin to a temperature of at least 140° C.

In some examples, the print apparatus 500 may be configured as a retrofit unit to a printer system, for example as a retrofit module for an electronic or electrostatic ink printer, for example a liquid electrophotography printer system. In such examples, the print apparatus 500 may be fitted to an existing printer system to irradiate a printed substrate which is output from the printer with narrowband UV radiation and treat the printed substrate.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
forming an image on a surface by controlled electrostatic transfer of a fluid print agent comprising thermoplastic resin disposed in a carrier fluid;
heating the fluid print agent on the surface to remove the carrier fluid and to melt the thermoplastic resin;
allowing the melted thermoplastic resin in continuous areas on the surface to fuse together to form an image from fused print agent by allowing the melted thermoplastic resin to cool;
providing a printed substrate bearing the image formed from fused print agent, wherein the fused print agent is a print agent in which the thermoplastic resin is at least partially set; and
irradiating the printed substrate with an ultraviolet narrowband source having an output between about 350 nm to about 420 nm supplying a radiation dose of between 0.75 J cm−2 and 3.0 J cm−2, inclusive, for an exposure time of approximately 0.07 seconds to approximately 0.3 seconds so as to cause heating of the thermoplastic resin to a temperature greater than 140° C., such that the image is fixed with no additional pressure being applied.

2. The method as claimed in claim 1 wherein the ultraviolet narrowband source comprises an ultraviolet light emitting diode array.

3. A print system comprising:
a print unit to print an image on a printed substrate from fused print agent comprising a thermoplastic resin, the print unit comprising:
an image unit to form an image on a surface by controlled electrostatic transfer of fluid print agent comprising thermoplastic resin disposed in a carrier fluid; and
a heating unit to heat the fluid print agent on the surface to remove the carrier fluid and to melt the thermoplastic resin to allow the melted thermoplastic resin in continuous areas on the surface to fuse together to form an image from fused print agent; and
a treatment unit comprising a narrowband ultraviolet source, to receive the printed substrate bearing the image formed from fused print agent, wherein the fused print agent is a print agent in which the thermoplastic resin is allowed to cool and is at least partially set, and irradiate the printed substrate with ultraviolet radiation having an output between about 350 nm to about 420 nm supplying a radiation dose of between 0.75 J cm−2 and 3.0 J cm−2, inclusive, for an exposure time of approximately 0.07 seconds to approximately 0.3 seconds to heat the thermoplastic resin to a temperature greater than 140° C., such that the image is fixed with no additional pressure being applied.

4. The print system as claimed in claim 3 wherein the narrowband ultraviolet source comprises an ultraviolet light emitting diode, LED, array.

5. The print system as claimed in claim 3 wherein the heating unit comprises an infrared source.

6. The print system as claimed in claim 3 comprising a conveyor unit to convey the printed substrate from the print unit to the treatment unit.

7. The print system as claimed in claim 3 wherein the print unit is to form the image from fused print agent on an intermediate surface and comprises a pressing unit to press the image from fused print agent on to the substrate to form the printed substrate.

8. The print system as claimed in claim 7 wherein the image unit is to form at least part of the image from fluid print agent on the intermediate surface and the heating unit is to heat the fluid print agent to melt the thermoplastic resin on the intermediate surface before pressing the fused print agent on to the substrate.

* * * * *